Aug. 27, 1968  W. WOLOWODIUK ET AL  3,398,789
HEAT EXCHANGERS FOR PRESSURE REACTING FLUIDS
Filed Jan. 25, 1965
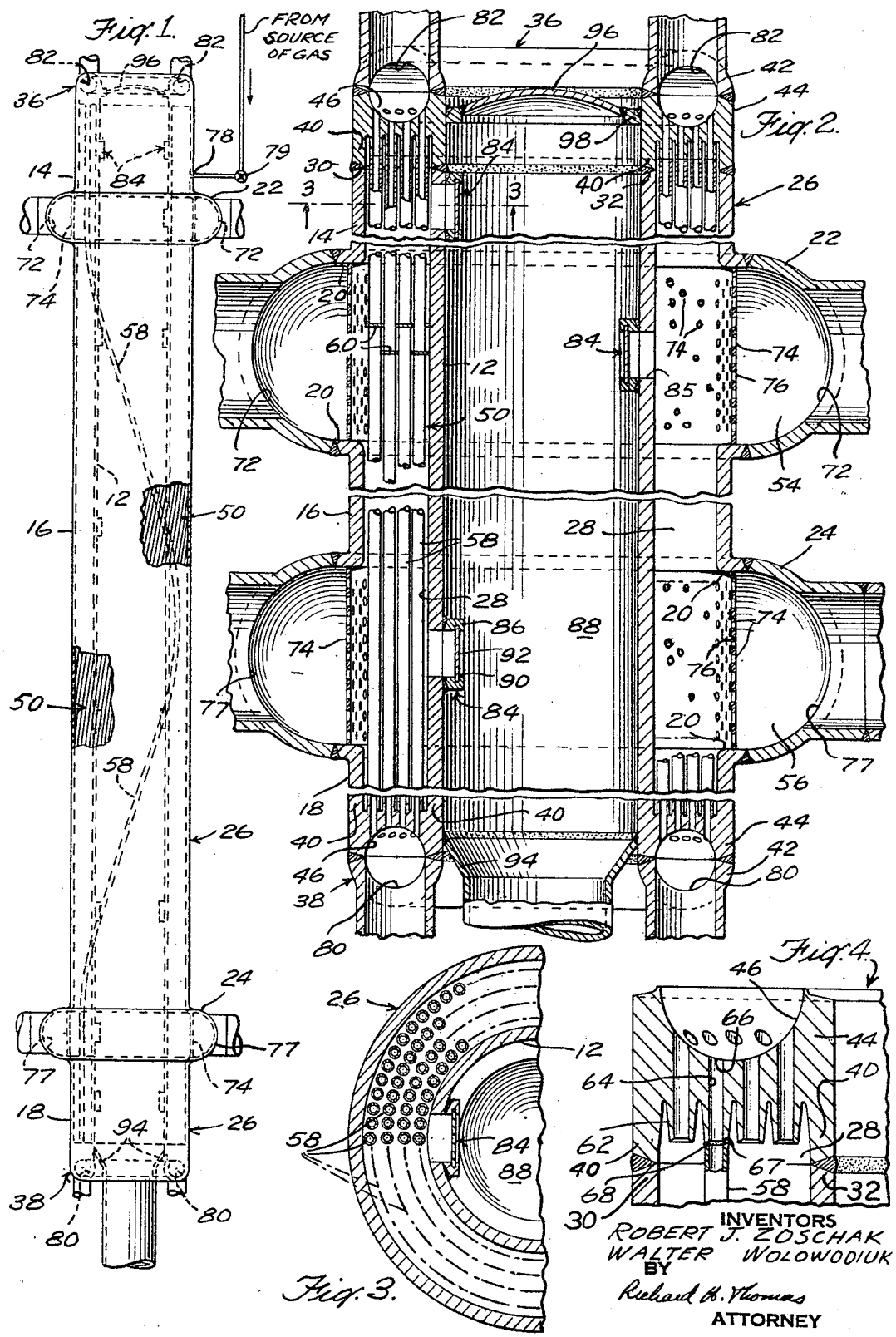
INVENTORS
ROBERT J. ZOSCHAK
WALTER WOLOWODIUK
BY
Richard H. Thomas
ATTORNEY United States Patent Office 3,398,789
Patented Aug. 27, 1968

3,398,789
HEAT EXCHANGERS FOR PRESSURE REACTING FLUIDS
Walter Wolowodiuk, Flushing, N.Y., and Robert J. Zoschak, Rutherford, N.J., assignors to Foster Wheeler Corporation, New York, N.Y., a corporation of New York
Filed Jan. 25, 1965, Ser. No. 427,666
3 Claims. (Cl. 165—134)

ABSTRACT OF THE DISCLOSURE

A heat exchanger including an inner cylindrical region for confining a heat exchange fluid and an outer cylindrical region concentrically disposed with respect to the inner region. The inner region is formed with rupture openings surrounded by a groove for receiving a rupture membrane designed to withstand normal operating pressures and to rupture at a predetermined excess pressure.

---

Heat exchangers containing chemically reacting fluids, which upon contact result in a pressure rise, are commonly utilized in various industries. For example, the chemical process industry is replete with applications where heat is required to be transferred between such fluids. Another example is the explosive industry, where heat is often exchanged between fluids that chemically react causing a pressure buildup. Still another example is the nuclear power field. There, for example, sodium appears to be a nearly ideal reactor coolant and heat exchanger medium; consequently, it has been used both as a reactor coolant and as a heat exchanger medium in nuclear reactor steam generators, although it violently reacts with water and steam.

A rise in pressure in a heat exchanger can be disadvantageous, as it may cause pressure dependent equipment upstream or downstream of the heat exchanger to function improperly, or, it may cause damage to such equipment, or cause damage to the heat exchanger itself. Furthermore, a chemical reaction between heat exchanger fluids may introduce undesirable reactant products into the system, and in nuclear systems, these products may contain potentially hazardous radioactive substances.

In heat exchangers for use with such fluids, it is desirable to have a safety arrangement for minimizing damage in the event the fluids come into contact and cause a pressure rise, and for disposing the resultant product.

Accordingly, the present invention makes provision in a heat exchanger for the above requirements in a novel and relatively compact manner. The heat exchanger vessel includes surfaces defining an elongated interior heat exchanger region in which one of the heat exchange fluids is confined and an inner pressure relief channel substantially encompassed by said heat exchanger region. Pressure sensitive rupture assemblies are provided designed to produce openings communicating the pressure relief channel with the interior heat exchanger region in the event the heat exchanger fluids come into contact and produce a pressure rise. The resultant fluid mixture is then discharged through these openings into the channel, the pressure increase in the heat exchanger thereby being abated and the mixture conducted away by the channel.

These and other advantages will become apparent from a description of a preferred embodiment of the present invention with reference to the accompanying drawings, in which:

FIGURE 1 is an elevation view of a typical heat exchanger according to the invention;
FIGURE 2 is a detailed cut-away view of FIG. 1;
FIGURE 3 is a section view taken along line 3—3 of FIG. 2; and
FIGURE 4 is an enlarged view of a portion of FIG. 2.

The heat exchanger of the invention illustrated in FIGS. 1 and 2 is annular in configuration and comprises a vertically oriented inner cylinder 12 about which are concentrically located three shorter outer cylinders 14, 16 and 18 having a common radius. The outer cylinders are axially disposed in spaced relationship from each other and have adjacent pairs of flanged ends 20 between which are circumferentially welded outwardly curving upper and lower semicircular toroidal header portions 22 and 24, which form therewith a substantially cylindrical outer assembly 26 with outwardly curving header portions. Outer assembly 26 and inner cylinder 12 define therebetween a substantially hollow cylindrical interior heat exchanger region 28, the opposite ends 30 of the outer assembly 26 lying on common planes with the opposite ends 32 of the inner cylinder 12 defining opposite coplanar concentric ring ends.

Upper and lower circular toroidal headers 36 and 38 are disposed at the opposite ring ends of the heat exchanger enclosing the heat exchanger region 28, the headers being connected to the ring ends by concentric cylindrical header end portions 40 extending from the headers. Each header is formed from two vertical halves designated external header section 42 and internal header section 44 which are circumferentially welded together defining therein toroidal curved header interiors 46. Toroidal headers are especially suited for use with hollow cylindrical heat exchangers being that they are easily adapted to provide highly curved interiors which are capable of withstanding high header fluid pressures and stresses occuring in large heat exchanger units.

A heat exchanger tube bundle 50 is provided in the heat exchanger region 28 secured at the tube ends to the headers. The tube bundle has a peripheral configuration in the shape of a hollow cylinder conforming to the dimensions of the portion of the heat exchanger region between the inner cylinder 12 and the outer cylinders and is disposed therein. The semicircular header regions 54 and 56, which are bounded by the header portions 22 and 24, respectively, thereby are free from the tube bundle.

The tubes are connected at the tube ends between the headers in such a manner as to minimize the occurrence of a tube failure. The tube bundle 50 comprises helically curved elongated heat exchanger tubes 58 which are connected between the upper and lower headers 36 and 38 so as to be in fluid communication with the curved interiors 46 thereof. The tubes define a 360° turn between the semicircular header portions 22 and 24, and are vertically oriented between the header portions 22 and 24 and the upper and lower headers 36 and 38, respectively, and are held in closely spaced parallel relationship by spacers 60 disposed at various positions along their length. Internal header sections 44 of upper and lower headers 36 and 38 are formed with a plurality of vertical header stubs 62 (shown in FIG. 4) projecting into the heat exchanger region 28. Each header stub has a channel 64 drilled therethrough which is in fluid communication at one end 66 with a curved header interior 46, and at the other end, the stub end 67, with the heat exchanger tube 58. The end of the heat exchanger tube is internally, circumferentially welded to the stub end as shown at weld connection 68, thereby minimizing the possibility of tube rupture. This type of weld connection and the advantages thereof are more fully described in U.S. Patent No. 3,084,243 for Internal Tube Welding Torch issued to Ronald W. Gotch on Apr. 2, 1963. The curved interior surfaces of curved header interiors 46 through which the stub channels are drilled prevent the weld connections 68 from rupture caused by stresses in the headers since the curved surfaces can withstand high pressures without distortion. Furthermore, since the tubes 58 have an overall curved length considerably greater than the vertical distance between the upper header 36 and the lower header 38, to which they are welded, the tubes 58 and tube header connections 68 are insured against rupture caused by different thermal expansion of tubes 58 and outer assembly 26 and inner cylinder 12.

The tube free regions 54 and 56 provide for uniform flow distribution of a heat exchange fluid about the tubes 58 in the heat exchanger regions 28. A hot primary heat exchange fluid such as liquid sodium passes into the heat exchanger regions 28 through two inlet openings 72 formed in the upper header portion 22. Curved distribution plates 74 having small openings 76 are vertically disposed in the heat exchanger region 28 between the flanged ends 20. The upper distribution plate prevents the hot liquid sodium from initially impinging upon the heat exchanger tubes directly adjacent the openings 72 and also causes the sodium to uniformly fill the upper semicircular header region 54 before entering the tube bundle portion of the heat exchanger region, as the fluid resistance in header region 54 is relatively low compared with the radial resistance offered by the small openings 76 in the distribution plate and the closely spaced tubes 58 in the tube bundle portion. After filling the region 54, the sodium radially enters the hollow cylindrical tube bundle portion of the heat exchanger region and uniformly descends therethrough surrounding all the tubes, collecting throughout the lower semicircular header region 56 and exiting therefrom through two outlet openings 77 formed in lower header portion 24. Distribution plate 74 is also disposed between flanged ends 20 in the lower header portion to prevent the sodium from exiting through the outlet openings before uniformly distributing within the entire lower header region 56. The uniform sodium distribution within header regions 54 and 56 insures a uniform sodium flow throughout the tube bundle portion of heat exchanger region 28. Without uniform distribution in header regions 54 and 56, flow irregularities may occur about the tube bundle and the effectiveness of the heat exchanger would be impaired.

To protect the upper toroidal header and tube weld connections 68, an inert gas, such as argon or nitrogen, is admitted into the upper portion of the heat exchanger blanketing the upper toroidal header. The inert gas enters the heat exchanger region 28 through an inert gas inlet 78 (FIG. 1) from a pressurized source of gas (not shown). The liquid sodium flow in region 28 causes the inert gas to rise to the top of heat exchanger region 28 providing a stagnant layer of inert gas surrounding the header stubs 62 and weld connections 68 at the upper header 36. If the sodium enters the heat exchanger faster than it leaves, the sodium rises and compresses the inert gas upward until the pressure of the inert gas equalizes the pressure of the sodium thereby preventing the sodium from rising further and causing possible damage to upper header 36 or to adjacent weld connections 68. The inert gas pressure is adjusted by a valve 79 to prevent the inert gas layer from being compressed beyond the weld connections. The inert gas further protects the upper header 36 and weld connections 68 against thermal shock during transient operations when the upper header and weld connections are relatively cold compared to the hot sodium entering the upper region 54. In this embodiment, there is no need for an inert gas blanket at the bottom header to protect against thermal shock since the sodium exiting from the lower region 56 is relatively cold.

The flow path for a secondary heat exchange fluid such as water or steam comprises the lower toroidal header 38, the tubes 58 and the upper toroidal header 36. The secondary fluid is supplied to the lower toroidal header 38 through two openings 80. Where water is used, the water fills the interior of the header and rises upward through the lower header channels 64 and heat exchanger tubes 58 communicating therewith, being converted into steam in the tubes by the hot sodium passing downward around the tubes. The steam then passes through the upper header channels 64 into the interior of upper header 36 and exits through two steam openings 82.

In the event the sodium and water or steam come into contact producing a pressure rise, a safety arrangement for minimizing the damage comprising rupture assemblies 84, is provided along the inner cylinder 12. Rupture openings 85 are formed at a plurality of vertical and circumferential positions in the inner cylinder 12. Connector stubs 86 are located in the interior of an inner cylindrical pressure relief channel 88, which channel is bounded by a portion of the heat exchanger vessel surface, namely inner cylinder 12 and are welded to the inner cylinder about the openings 85. The stubs 86 are formed with grooves 90 disposed around the rupture openings for holding rupture membranes 92 therein, which together with the associated connector stubs, form an air-tight enclosure about the rupture openings 85 for containing the liquid sodium in the interior heat exchanger region 28 during normal operating conditions. The stubs 86, grooves 90 therein, openings 85 and rupture membranes 92 comprise the rupture assemblies 84.

The membranes are designed to rupture when, due to a tube failure, the sodium and water come into contact causing the pressure in the interior region 28 to exceed the pressure in the inner pressure relief channel 88 by a predetermined value. Sodium-water reaction products are ejected through the ruptured membranes into the channel 88 relieving the pressure in the interior heat exchanger region, and the products are conducted downward along the channel and out of the system through neck 94 at the bottom of the channel into a dump chamber (not shown). Where the sodium is radioactive, the dump chamber is isolated. The faulty tube which caused the event is then plugged, or the heat exchanger removed and repaired, or replaced.

A dome-shaped cover 96 is circumferentially welded to upper stubs 98 which in turn are welded to the inner, cylindrical end portion 40 of the upper header 36 for covering the top of the channel so as to prevent sodium-water products from being ejected out of the channel in the event of a sodium-water accident.

It is readily apparent from the foregoing description that an ovel heat exchanger of simple and compact design has been provided for reducing the occurrence of tube failure and consequent sodium and water or steam contact; and for providing a unique safety arrangement for relieving a pressure buildup and for conducting away any resultant sodium-water products in the event of a tube failure. Both the construction of the safety arrangement and the features for tube integrity and consequent separation of the heat exchange fluids are especially adapted to cooperate spacially with each other; e.g., the inner cylindrical pressure relief channel is especially adapted to a helical arrangement of tubes, annular type sodium header regions and curved steam header interiors.

Although the invention has been described in its preferred form with a certain degree of particularity, it is understood that the present disclosure of the preferred form has been made only by way of example and that numerous other changes in the details and the combination and arrangements of parts may be resorted to without departing from the spirit and scope of the invention as hereinafter claimed.

What is claimed is:
1. A heat exchanger comprising:
   an elongated inner cylinder, vertically oriented, defining a cylindrical inner pressure relief channel, the inner cylinder having a plurality of rupture openings formed therein at various positions along its length and circumference;
   a connector stub on the inner cylinder about each rupture opening, the connector stub defining a connector stub groove therearound;

an outer assembly comprising:

an outer cylinder having a radius larger than the radius of the inner cylinder disposed concentrically about the inner cylinder;

two semicircular toroidal header portions, each portion having two ends and circumferentially joined at one end in a radially outward curving direction to one end of the outer cylinder, the header portions each defining at least one header portion opening therein;

two end cylinders having the same radius as the outer cylinder, each circumferentially joined to the other end of a header portion;

the outer assembly having an axial length substantially the same as the length of the inner cylinder and disposed relative the inner cylinder so that the ends of the outer assembly define coplanar concentric ring ends with the ends of the inner cylinder, the outer assembly and the inner cylinder thereby defining an open-ended substantially hollow cylindrical region therebetween with outwardly curving header portions;

two circular toroidal headers, each header connected to a coplanar concentric ring end so as to enclose the open-ends of the hollow cylindrical region, each header including circular toroidal interior surfaces defining circular toroidal header interiors, said circular toroidal headers formed with a plurality of header stubs vertically projecting therefrom into the hollow cylindrical region, each header defining stub channels through the header stubs communicating with the circular toroidal header interiors;

a plurality of helically curved heat exchanger tubes uniformly disposed in closely spaced relationship from each other within the hollow cylindrical region, the tubes internally and circumferentially welded at opposite ends to the header stubs about the stub channels therein on the opposite headers, the tubes oriented to form a tube bundle having a hollow cylindrical periphery with an inner radius substantially equal to the radius of the inner cylinder and an outer radius substantially equal to the radius of the outer cylinder;

a distribution plate disposed in the hollow cylindrical region in spaced relationship adjacent the header portion openings and in close proximity to the tube bundle; and a rupture membrane disposed in the connector stub groove, the rupture membrane and connector stub sealing the rupture opening, the rupture membrane designed to withstand normal operating pressures within the hollow cylindrical region and to rupture when the pressure in the hollow cylindrical region exceeds the pressure in the inner pressure relief channel by a predetermined value.

2. The heat exchanger of claim 1 further comprising means for passing inert gas into the hollow cylindrical region and for adjusting the pressure of the inert gas therein.

3. The heat exchanger of claim 1 further comprising a cover disposed adjacent the upper end of the inner cylinder so as to enclose the upper portion of the inner pressure relief channel.

References Cited

UNITED STATES PATENTS

| Re. 25,808 | 6/1965 | Amorosi et al. | 165—11 |
| 1,655,086 | 1/1928 | Blanding | 165—163 |
| 1,892,778 | 1/1933 | Black | 165—163 X |
| 3,126,949 | 3/1964 | Boni Jr. et al. | 165—158 |
| 3,245,464 | 4/1966 | Ammon et al. | 165—158 X |
| 2,844,360 | 7/1958 | Buri | 165—158 X |

FOREIGN PATENTS

| 984,248 | 2/1951 | France. |
| 616,543 | 2/1961 | Italy. |
| 916,071 | 1/1963 | Great Britain. |

ROBERT A. O'LEARY, *Primary Examiner.*

A. W. DAVIS, *Assistant Examiner.*